United States Patent
Shen et al.

(10) Patent No.: US 11,451,890 B2
(45) Date of Patent: Sep. 20, 2022

(54) VIRTUAL OPTICAL NETWORK-ORIENTED SPECTRUM RESOURCE TRADING METHOD AND SYSTEM

(71) Applicant: SOOCHOW UNIVERSITY, Suzhou (CN)

(72) Inventors: Gangxiang Shen, Suzhou (CN); Shifeng Ding, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 0 days.

(21) Appl. No.: 17/422,189

(22) PCT Filed: Sep. 23, 2019

(86) PCT No.: PCT/CN2019/107212
§ 371 (c)(1),
(2) Date: Jul. 10, 2021

(87) PCT Pub. No.: WO2020/155653
PCT Pub. Date: Aug. 6, 2020

(65) Prior Publication Data
US 2022/0086539 A1    Mar. 17, 2022

(30) Foreign Application Priority Data
Feb. 1, 2019 (CN) .................. 201910103986.8

(51) Int. Cl.
*H04Q 11/00* (2006.01)
*H04L 41/0896* (2022.01)

(52) U.S. Cl.
CPC ..... *H04Q 11/0062* (2013.01); *H04L 41/0896* (2013.01); *H04Q 2011/0086* (2013.01)

(58) Field of Classification Search
CPC ................................ H04Q 11/0062
See application file for complete search history.

(56) References Cited

U.S. PATENT DOCUMENTS

2006/0034438 A1* 2/2006 O'Neill ............... H04L 47/762
    379/114.07
2015/0146521 A1* 5/2015 Zhu ...................... H04L 47/826
    370/229
(Continued)

FOREIGN PATENT DOCUMENTS

CN    104301255 A    1/2015
CN    106100722 A    11/2016
(Continued)

OTHER PUBLICATIONS

Xie et al., "Dynamic Resource Pooling and Trading Mechanism in Flexible-Grid Optical Network Virtualization", IEEE 2014 (Year: 2014).*

*Primary Examiner* — Shi K Li
(74) *Attorney, Agent, or Firm* — SZDC Law P.C.

(57) ABSTRACT

The invention provides a virtual optical network-oriented spectrum resource trading method and system. The method includes: after virtual optical networks are constructed according to a preset topological structure, in different time slots, controlling, based on capacity demand information of virtual links of the virtual networks, cumulative credit values of the virtual optical networks, and a preset credit threshold, the virtual links between the virtual optical networks to trade spectrum resources of a common physical link, to implement that the virtual optical networks trade spectrum resources according to a real-time capacity demand. A virtual link with idle spectrum resources can supply spectrum resources to a virtual link with insufficient capacity, and a virtual optical network with insufficient spectra can perform spectrum trading to use idle spectra of other virtual optical networks to transmit undeployed service traffic of the virtual optical network, thereby effectively improving the utilization of network spectrum resources.

10 Claims, 6 Drawing Sheets

(56) References Cited

U.S. PATENT DOCUMENTS

2015/0333824 A1   11/2015  Swinkels et al.
2016/0191219 A1*  6/2016  Zhu .................... H04Q 11/0066
                                                         398/45

FOREIGN PATENT DOCUMENTS

CN        108377220 A    8/2018
CN        109617752 A    4/2019

* cited by examiner

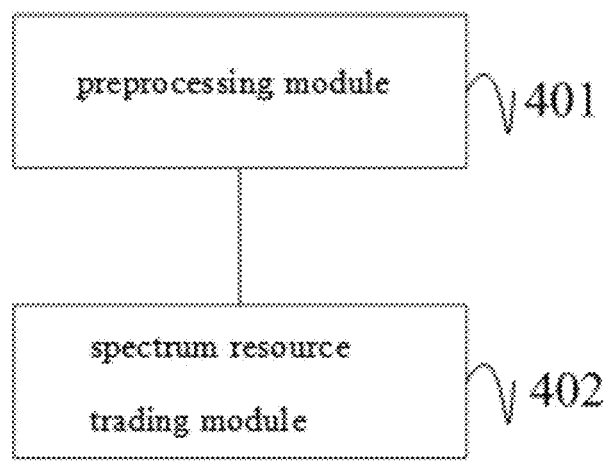

FIG. 4

| Block sequence number | |
| --- | --- |
| Time slot index | |
| User 1 | User 2 |
| Current cumulative credit value 1 | Current cumulative credit value 2 |
| Virtual link index 1 | Virtual link index 2 |
| Physical link index | |
| Current spectrum status | |
| FS demand quantity | FS supply quantity |
| Current time slot credit value 1 | Current time slot credit value 2 |
| Updated spectrum status | |
| Updated cumulative credit value 1 | Updated cumulative credit value 2 |

FIG. 5

VIRTUAL OPTICAL NETWORK-ORIENTED SPECTRUM RESOURCE TRADING METHOD AND SYSTEM

This application is the National Stage Application of PCT/CN2019/107212, filed on Sep. 23, 2019, which claims priority to Chinese Patent Application No. 201910103986.8, filed on Feb. 1, 2019, which is incorporated by reference for all purposes as if fully set forth herein.

FIELD OF THE INVENTION

The present invention relates to the field of network virtualization technologies, and more particularly to a virtual optical network-oriented spectrum resource trading method and system.

DESCRIPTION OF THE RELATED ART

With the fast development of Internet technologies and various intelligent equipment manufacturing technologies, the demand of users for Internet traffic grows exponentially. Optical transmission networks are backbone networks that bear user traffic and are faced with massive pressure. The demand pressure of user traffic can be alleviated by increasing the utilization of optical network resources, and a network virtualization technology emerges accordingly.

Network virtualization divides a physical optical network into a plurality of independent virtual optical networks. The virtual optical networks are embedded in the physical optical network to obtain spectrum resources to serve different users.

In the related art, after the virtual optical networks are embedded in the physical optical network, spectrum resources allocated by the virtual optical networks are fixed within a service period. However, service traffic of the virtual optical networks keeps changing. Within a period of time, service traffic on the virtual optical networks is relatively low, and most spectrum resources allocated by the virtual optical networks are in an idle state. Within another period of time, service traffic on the virtual optical networks is relatively high, and spectrum resources allocated by the virtual optical networks become insufficient. With the fluctuations in real-time service traffic and the fixed resource allocation manner, the utilization of network spectrum resources is relatively low.

SUMMARY OF THE INVENTION

The present disclosure provides a virtual optical network-oriented spectrum resource trading method and system, to effectively improve the utilization of spectrum resources of virtual optical networks.

To solve the foregoing technical problems, the present invention provides the following technical solutions:

According to an aspect, the present invention provides a virtual optical network-oriented spectrum resource trading method, including:

constructing a group of virtual optical networks in advance according to a preset topological structure, and configuring capacity demand parameters for virtual links of each virtual optical network;

controlling, based on capacity demand parameters of the virtual links in different time slots, cumulative credit values of the virtual optical networks, and a preset credit threshold, the virtual links between the virtual optical networks to trade spectrum resources of a common physical link, to implement that a virtual link with idle spectrum resources supplies spectrum resources to a virtual link with insufficient capacity, where the virtual optical networks have a spectrum conversion capability and a subband virtual concatenation transmission capability, and virtual links that trade spectra have a common physical link; the capacity demand parameter includes a virtual optical network to which a virtual link belongs, a source node and a destination node of the virtual link, a time slot index, a start index and an end index of frequency slots (FSs) allocated to the virtual link, and an FS demand quantity for meeting all service traffic on the virtual link (the source node and the destination node) in a current time slot; and the cumulative credit value is a sum of credit values of a virtual optical network in time slots before the current time slot.

Preferably, the controlling, based on capacity demand parameters of the virtual links in different time slots, cumulative credit values of the virtual optical networks, and a preset credit threshold, the virtual links between the virtual optical networks to trade spectrum resources of a common physical link includes:

building an integer linear programming (ILP) model in advance; and implementing trading of spectrum resources between the virtual links between the virtual optical networks based on the ILP model, where constraint conditions of the ILP model include that a virtual link preferentially uses allocated FSs to bear service traffic, a virtual link does not use FSs that are not allocated to the virtual optical networks, a quantity of FSs borrowed by a virtual link does not exceed the FS demand quantity, spectra used by virtual links that have a common physical link do not overlap, and a virtual optical network whose cumulative credit value is less than the credit threshold is prohibited from using idle spectra of other virtual optical networks in the current time slot.

Preferably, the constraint conditions of the ILP model further include that a quantity of nonadjacent subbands deployed for use by the virtual links does not exceed 2.

Preferably, the controlling, based on capacity demand parameters of the virtual links in different time slots, cumulative credit values of the virtual optical networks, and a preset credit threshold, the virtual links between the virtual optical networks to trade spectrum resources of a common physical link includes:

for the virtual optical networks in one time slot, after service traffic is deployed for the virtual optical networks by using pre-allocated spectra, putting a virtual link with undeployed service traffic in each virtual optical network on a pre-established virtual link list;

sequentially taking a first virtual link from the virtual link list till the virtual link list is empty, where an undeployed service traffic value of the first virtual link is the largest in the virtual link list; and if a cumulative credit value of a virtual optical network to which the first virtual link belongs is not less than the credit threshold, examining, by using a spectrum window, spectrum usage of a physical path in which the first virtual link is located, selecting idle spectra by using a first-fit algorithm to transmit undeployed service traffic of the first virtual link, deleting the first virtual link from the virtual link list, and updating the cumulative credit value of the corresponding virtual optical network; or if a cumulative credit value of a virtual optical network to which the first virtual link belongs is less than the credit threshold, deleting the first virtual link from the virtual link list.

Preferably, the putting a virtual link with undeployed service traffic in each virtual optical network on a pre-established virtual link list includes:

arranging virtual links of each virtual optical network in descending order of undeployed service traffic values, and putting the sorted virtual links on the pre-established virtual link list sequentially; and correspondingly, the first virtual link is the first virtual link in the virtual link list.

Preferably, the examining, by using a spectrum window, spectrum usage of a physical path in which the first virtual link is located, and selecting idle spectra by using a first-fit algorithm to transmit undeployed service traffic of the first virtual link includes:

determining whether idle spectrum resources of virtual optical networks that have a common physical link with the first virtual link are sufficient to transmit the undeployed service traffic of the first virtual link; and if not, using spectrum resources that are not allocated by a carrier to the virtual optical networks to transmit the undeployed service traffic of the first virtual link, and paying a corresponding charge; or if yes, selecting, by using the first-fit algorithm, idle spectra from the spectrum resources allocated to the virtual optical networks to transmit the undeployed service traffic of the first virtual link.

Preferably, after the constructing a group of virtual optical networks in advance according to a preset topological structure, the method further includes:

dividing the group of virtual optical networks into a plurality of spectrum trading groups, where virtual links of virtual optical networks in each spectrum trading group trade spectrum resources, and virtual optical networks in different spectrum trading groups do not trade spectrum resources.

The present invention further provides a virtual optical network-oriented spectrum resource trading system, including a software-defined networking (SDN) controller and a memory, where the SDN controller is configured to execute a computer program stored in the memory to implement the steps of the foregoing virtual optical network-oriented spectrum resource trading method.

Preferably, the memory includes a blockchain database, where the blockchain database saves spectrum resource trading data information between virtual optical networks in a data block according to a preset storage format; and the storage format of the data block is formed by a block sequence number, an index of a time slot in which current spectrum resource trading occurs, a first virtual optical network and a second virtual optical network participating in spectrum resource trading, a physical link index, a current spectrum status, an updated spectrum status, a current cumulative credit value, virtual link indices, an FS demand quantity, a current time slot credit value, and an updated cumulative credit value of the first virtual optical network, and a current cumulative credit value, virtual link indices, an FS supply quantity, a current time slot credit value, and an updated cumulative credit value of the second virtual optical network.

Preferably, the blockchain database selects a virtual optical network according to the following formula to create a new data block:

$$\theta = C*t, \text{ where}$$

in the formula, $\theta$ is a time-weighted credit value, C is a current cumulative credit value of the virtual optical network in a current time slot, and t is a duration of the current cumulative credit value.

The advantages of the technical solutions provided in the present application are as follows: A virtual optical network with idle spectrum resources and a virtual optical network with insufficient spectrum resources are determined according to FS demand quantities of virtual links of virtual networks in different time slots and existing FSs. Virtual links that have a common physical link then trade spectrum resources according to the FS demand quantities, to enable a virtual link with idle spectrum resources to supply spectrum resources to a virtual link with insufficient capacity, and a virtual optical network with insufficient spectra can perform spectrum trading to use idle spectra of other virtual optical networks to transmit undeployed service traffic of the virtual optical network, to implement that the virtual optical networks trade spectrum resources according to a real-time capacity demand, thereby effectively improving the utilization of spectrum resources of the virtual optical networks, and reducing a service congestion rate of the virtual optical networks. In addition, cumulative credit values of the virtual optical networks and a credit threshold are set, and the fairness of spectrum resource trading between the virtual optical networks can be ensured, to avoid that a virtual optical network only uses spectrum resources but does not supply spectrum resources.

In addition, the present invention further provides a corresponding implementation system for the virtual optical network-oriented spectrum resource trading method, to further make the method more practicable, and the system has corresponding advantages.

It should be understood that the foregoing general description and the following detailed description are only exemplary, and cannot limit the present disclosure.

BRIEF DESCRIPTION OF THE DRAWINGS

For clearer descriptions of the technical solutions in the embodiments of the present invention or the related art, the following briefly introduces the accompanying drawings required for describing the embodiments or the related art. Apparently, the accompanying drawings in the following description show merely some embodiments of the present invention, and a person of ordinary skill in the art may still derive other drawings from the accompanying drawings without creative efforts.

FIG. 4 is a structural diagram of a specific implementation of a virtual optical network-oriented spectrum resource trading apparatus according to an embodiment of the present invention;

FIG. 5 is a schematic structural diagram of a data block storage format of a data block of a blockchain according to an embodiment of the present invention;

DETAILED DESCRIPTION OF THE PREFERRED EMBODIMENTS

To enable a person skilled in the art to better understand the solutions of the present invention, the present invention is further described below in detail with reference to the accompanying drawings and specific implementations. Apparently, the described embodiments are merely some rather than all of the embodiments of the present invention. All other embodiments obtained by a person of ordinary skill in the art based on the embodiments of the present invention without creative efforts fall within the protection scope of the present invention.

The terms such as "first", "second", "third", and "fourth" in the description and claims of the present application and the foregoing accompanying drawings are only used to distinguish between different objects, but are not used to describe a specific order. In addition, the terms "include", "have", and any variation of such terms are intended to cover a non-exclusive inclusion. For example, a process, method, system, product or device that includes a series of steps or units not only includes those specified steps or units, but also includes steps or units that are not specified.

After the technical solutions of the embodiments of the present invention are described, various nonlimitative implementations of the present application are described below in detail.

Figure 1:
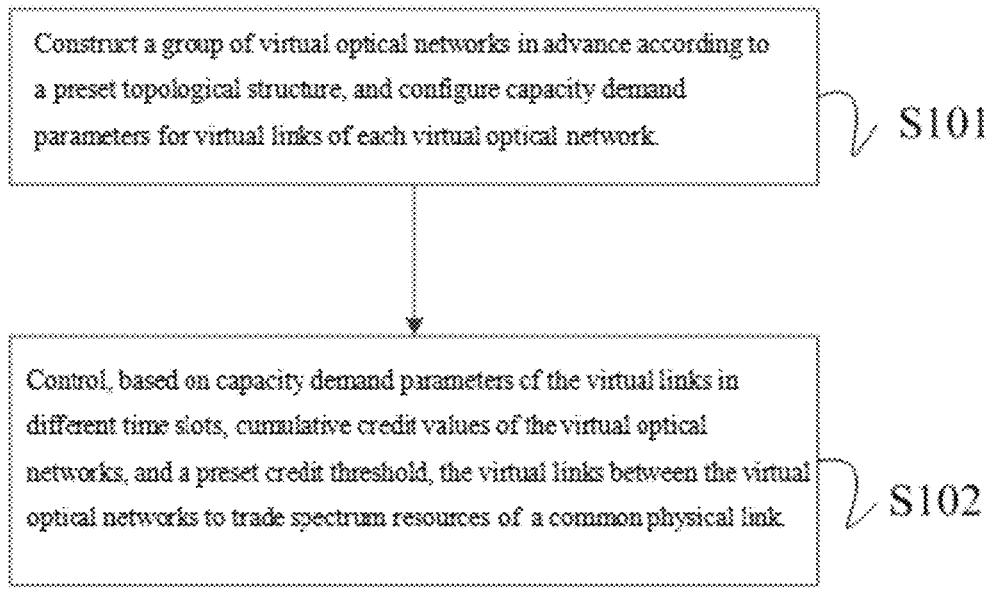
FIG. 1 is a schematic flowchart of a virtual optical network-oriented spectrum resource trading method according to an embodiment of the present invention.

First, referring to FIG. 1, FIG. 1 is a schematic flowchart of a virtual optical network-oriented spectrum resource trading method according to an embodiment of the present invention. This embodiment of the present invention may include the following content:

S101: Construct a group of virtual optical networks in advance according to a preset topological structure, and configure capacity demand parameters for virtual links of each virtual optical network.

S102: Control, based on capacity demand parameters of the virtual links in different time slots, cumulative credit values of the virtual optical networks, and a preset credit threshold, the virtual links between the virtual optical networks to trade spectrum resources of a common physical link.

The virtual optical networks are virtual networks built according to a user request and network resources and functions. A plurality of virtual optical networks may be constructed for an actual physical optical network by using any related technology. For mapping relationships between the virtual optical networks and the physical optical network and a construction process, reference may be made to the description of the related art. Details are not described again herein. For example, a physical path in which each virtual link of a virtual optical network is located may be determined by using a virtual network embedding (VNE) method.

Spectrum trading is substantially gathering all virtual optical networks to form an open spectrum resource trading market. All participating virtual optical networks may trade spectra with each other. A virtual optical network with insufficient spectra can perform spectrum trading to use idle spectra of other virtual optical networks to transmit undeployed service traffic of the virtual optical network. According to whether spectra of virtual links after trading is completed meet consistency and adjacency, spectrum resource trading has the following three cases:

First: Two virtual links are located in identical physical paths and have adjacent spectra. In this case, traded spectra are kept consistent on the entire physical path and are adjacent to a spectrum of a virtual link with insufficient capacity. This case is applicable to a network that has neither a spectrum conversion capability nor a subband virtual concatenation transmission capability.

Second: Two virtual links are located in identical physical paths but have nonadjacent spectra. In this case, traded spectra are kept consistent on the entire physical path but are nonadjacent to a spectrum of a virtual link with insufficient capacity. This case is applicable to a network that does not have a spectrum conversion capability but has a subband virtual concatenation transmission capability.

Third: Two virtual links have a common physical link but have nonadjacent spectra. In this case, the virtual links only trade spectra on the common physical link. This case is applicable to a network that has both a spectrum conversion capability and a subband virtual concatenation transmission capability.

It is considered to maximize the utilization of network spectrum resources. The virtual optical networks in the present application have a spectrum conversion capability and a subband virtual concatenation transmission capability. The subband virtual concatenation transmission may provide the network with a capability of using nonadjacent spectra to transmit a service. In this case, the network can transmit adjacent spectra and also can transmit nonadjacent spectra. If physical paths in which virtual links of two virtual optical networks are located have a common physical link, a virtual link with idle spectra on the physical link may trade idle spectrum resources of the virtual link with a virtual link with insufficient capacity.

For a group of virtual optical networks with a predetermined topology, a particular quantity of FSs are allocated to virtual links of each virtual optical network, which may be represented as $C(v, s, d, x, y)$. v is a virtual optical network to which a virtual link belongs. s and d are a source node and a destination node of the virtual link. x and y are a start index and an end index of FSs allocated to the virtual link. A capacity demand of the virtual link may be defined as $R(v, s, d, tF_t)$. t is a time slot index, and $F_t$ is an FS demand quantity for meeting all service traffic on the virtual link (s, d) in a time slot t. That is, for each virtual optical network, the capacity demand parameter of a virtual link of the virtual optical network may include a virtual optical network to which the virtual link belongs, a source node and a destination node of the virtual link, a time slot index, a start index and an end index of FSs allocated to the virtual link, and an FS demand quantity for meeting all service traffic on the virtual link (the source node and the destination node) in a current time slot.

In different time slots, FS demand quantities for all service traffic on the virtual link (s, d) may be different. Each virtual link may have different capacity demand parameters for different time slots. That is, the capacity demand parameter of each virtual link changes in real time, and needs to be updated in real time.

To ensure the fairness of spectrum resource trading of virtual optical networks, that is, to ensure that each virtual optical network can supply idle spectrum resources to other virtual optical networks and can also use other spectrum resources to transmit undeployed service traffic of the virtual optical network, a parameter may be set to indicate a resource trading status of the virtual optical network.

In a specific implementation, a credit value may be set for a virtual optical network. The credit value of the virtual optical network is determined by spectrum resources supplied or used by the virtual optical network in the current time slot. After supplying idle spectrum resources to other virtual optical networks, the virtual optical network obtains a corresponding credit value. A virtual optical network using idle spectrum resources obtains a corresponding negative credit value. The cumulative credit value is a sum of credit values of the virtual optical network in time slots before the current time slot. The cumulative credit value may reflect a spectrum resource trading status of the virtual optical network in the current time slot. If a cumulative credit value of a virtual optical network has a relatively large absolute value and is negative, it indicates that the virtual optical network uses a relatively large quantity of spectrum resources of other virtual optical networks. To avoid that a virtual optical network only uses idle spectrum resources of other virtual optical networks but does not supply spectrum resources, a credit threshold may be preset. A virtual optical network whose cumulative credit value is less than the preset credit threshold is prohibited from using idle spectrum resources supplied by other virtual optical networks. The setting of the credit thresholds may be determined by a person skilled in the art according to a topological structure and a service running status of the virtual optical networks. This does not affect the implementation of the present application.

The cumulative credit value can ensure the fairness of spectrum resource trading between the virtual optical networks, to avoid that a virtual optical network only uses spectrum resources but does not supply spectrum resources. In addition, if it is set that a virtual optical network uses idle spectrum resources, the virtual optical network obtains a negative credit value. In this case, when the absolute value of the negative value of the cumulative credit value is larger, the virtual optical network is less likely to be selected by a blockchain to create a new block. The reason is that the virtual optical network uses many idle resources of other virtual networks, and the virtual optical network may tamper data to continue using idle resources. Therefore, the virtual optical network is not selected to create a new block, so that the security of the blockchain can be further effectively improved.

If the credit threshold represents a minimum value for allowing the virtual optical network not to supply spectrum resources to other virtual optical networks, in this case, as long as a cumulative credit value of a current virtual optical network is greater than the credit threshold, the virtual optical network is a virtual optical network that meets a credit condition.

In the current time slot, for the virtual optical network that meets the credit condition, based on the capacity demand parameters of the virtual links, a virtual optical network with idle spectrum resources and a virtual optical network with insufficient spectrum resources may be known. According to an FS demand quantity for a source virtual optical network with insufficient spectrum resources, a target virtual optical network that can supply spectrum resources to the source virtual optical network is determined. Idle spectra of the target virtual optical network are then used to transmit undeployed service traffic of the source virtual optical network, to implement that the virtual optical networks trade spectrum resources according to a real-time capacity demand.

In the technical solution provided in this embodiment of the present invention, a virtual optical network with idle spectrum resources and a virtual optical network with insufficient spectrum resources are determined according to FS demand quantities of virtual links of virtual networks in different time slots and existing FSs. Virtual links that have a common physical link then trade spectrum resources according to the FS demand quantities, to enable a virtual link with idle spectrum resources to supply spectrum resources to a virtual link with insufficient capacity, and a virtual optical network with insufficient spectra can perform spectrum trading to use idle spectra of other virtual optical networks to transmit undeployed service traffic of the virtual optical network, to implement that the virtual optical networks trade spectrum resources according to a real-time capacity demand, thereby effectively improving the utilization of spectrum resources of the virtual optical networks, and reducing a service congestion rate of the virtual optical networks. In addition, cumulative credit values of the virtual optical networks and a credit threshold are set, and the fairness of spectrum resource trading between the virtual optical networks can be ensured, to avoid that a virtual optical network only uses spectrum resources but does not supply spectrum resources.

Figure 2:
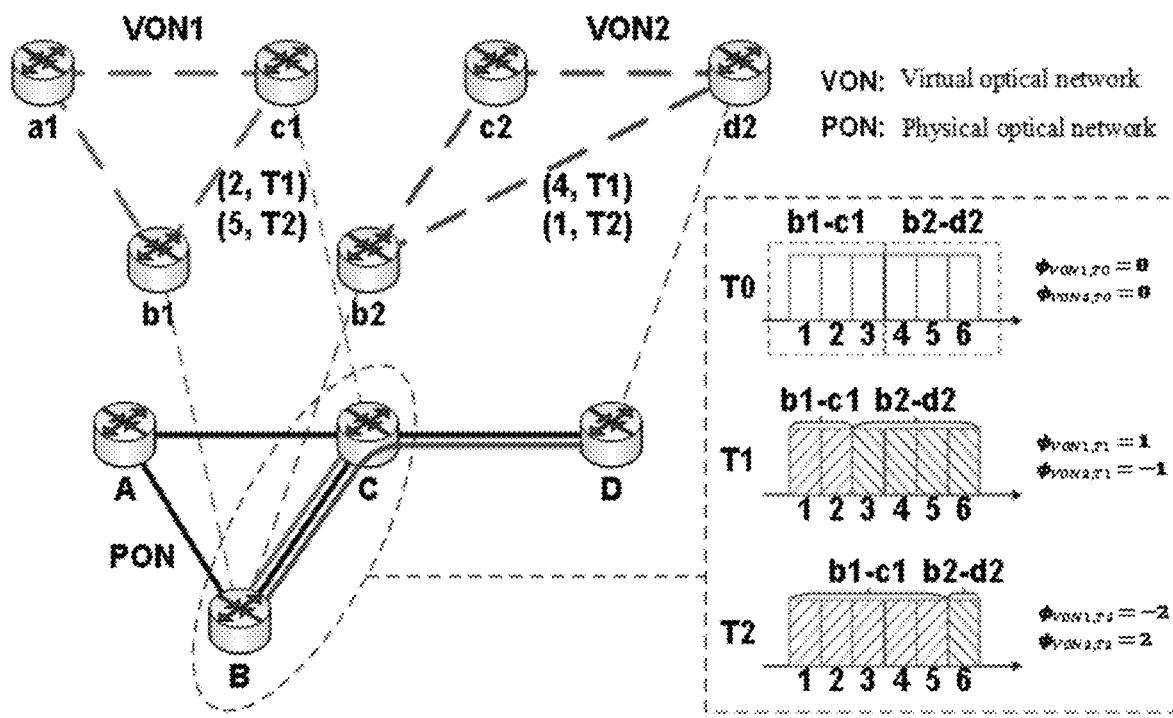
FIG. 2 is a schematic block diagram of an exemplary application scenario according to an embodiment of the present invention.

To make an implementation process of the technical solution of the present application more comprehensible to a person skilled in the art, referring to FIG. 2, the present application further provides a specific embodiment to describe spectrum resource trading between virtual optical networks. This embodiment of the present invention may include the following content:

As can be known from FIG. 2, virtual optical networks VON1 and VON2 are mapped into one same physical optical network PON. A virtual link b1-c1 of VON1 and a virtual link b2-d2 of VON2 are respectively mapped to physical paths B-C and B-C-D. The virtual optical networks VON1 and VON2 have a spectrum conversion capability and a subband virtual concatenation transmission capability.

Because the two virtual links have a common physical link B-C, VON1 and VON2 may trade spectra on the physical link B-C according to a real-time capacity demand. (F, t) may be used to represent a real-time capacity demand on a virtual link, where F is an FS demand quantity, and t is a time slot index. For example, $(2, T_1)$ in FIG. 2 represents that the virtual link b1-c1 demands two FSs in a time slot $T_1$. A spectrum use status on the physical link B-C is shown by the subfigure at the lower right corner of FIG. 2.

After a time slot $T_0$ (virtual network mapping), three FSs are allocated to each of the virtual links b1-c1 and b2-d2. In the time slot $T_1$, FS demand quantities of the virtual links b1-c1 and b2-d2 are respectively 2 and 4. In a case that a spectrum trading scheme is not used, because allocated capacity is insufficient, 25% of service traffic on the virtual link b2-d2 is congested. In a case that a spectrum trading scheme is used, the virtual link b2-d2 may borrow one FS from the virtual link b1-c1 to deploy services of the virtual link b2-d2. Similarly, in a time slot $T_2$, FS demand quantities for the virtual links b1-c1 and b2-d2 are respectively 5 and 1. If a spectrum trading scheme is not used, 40% of service traffic on the virtual link b1-c1 is congested. However, if a spectrum trading scheme is used, the virtual link b1-c1 may borrow two FSs from the virtual link b2-d2, so that it can be ensured that services of the virtual link b1-c1 are completely deployed. In this embodiment of the present invention, total spectrum utilization of the physical link B-C in the time slots $T_1$ and $T_2$ is increased by 25%. For a calculation process, reference may be made to the following formula:

$$[(12-9)\div 12]*100\%=25\%.$$

A credit value parameter $\varphi_{v,t}$ may be defined to record credit obtained by virtual optical networks in spectrum resource trading, where v is a virtual optical network, and t is a time slot index. As shown in FIG. 2, in the time slot $T_1$, VON1 supplies one idle FS to VON2, a credit value of VON1 is $\varphi_{VON1,T_1}=1$, and a credit value of VON2 is $\varphi_{VON2,T_1}=-1$. Similarly, in the time slot $T_2$, VON2 supplies two idle FSs to VON1, a credit value of VON1 is $\varphi_{VON1,T_2}=-2$, and a credit value of VON2 is $\varphi_{VON2,T_2}=2$.

A cumulative credit value parameter of the virtual optical network may be defined as $\gamma_{v,T}=\Sigma_{i=1,2,\ldots,T}\varphi_{v,t}$, representing a sum of all credit values $\varphi_{v,t}$ of the virtual optical network v in first T time slots. In FIG. 2, a cumulative credit value of VON1 is $\gamma_{VON1,T_2}=-2+1=-1$, and a cumulative credit value of VON2 is $\gamma_{VON2,T_2}=2+(-1)=1$. If $\gamma_{v,T}<\mu$ (the cumulative credit value is less than the credit threshold) in the time slot T, the virtual optical network v is prohibited from using idle spectrum resources of other virtual optical networks in the time slot. $\mu$ is a preset credit threshold.

The present invention effectively improves the utilization of network spectrum resources of virtual optical networks, reduces a service congestion rate of the virtual optical networks, and further ensure the fairness of spectrum resource trading between the virtual optical networks.

To implement spectrum resource trading between virtual optical networks, in the present application, an ILP model may be further built in advance to resolve a spectrum resource trading problem.

Constraint conditions of the ILP model may include that a virtual link preferentially uses allocated FSs to bear service traffic, a virtual link does not use FSs that are not allocated to the virtual optical networks, a quantity of FSs borrowed by a virtual link cannot exceed an FS demand quantity, spectra used by virtual links that have a common physical link do not overlap, and a virtual optical network whose cumulative credit value is less than the credit threshold is prohibited from using idle spectra of other virtual optical networks in the current time slot.

In the present application, a plurality of constraint conditions are set for the ILP model, so as to obtain an optimal solution of spectrum resource trading. Based on the foregoing constraint conditions, the ILP model may be built by using any related technology. For a specific building process, details are not described again herein.

In addition, to reduce the calculation complexity of the ILP model, the constraint conditions of the ILP model further includes that a quantity of nonadjacent subbands that can be used by the virtual optical networks does not exceed 2.

In spectrum resource trading, any virtual optical networks may trade spectra with each other. As a result, the implementation and management of spectrum trading schemes are relatively complex, and cause a particular resource waste. Some virtual optical networks may have never traded spectra. Therefore, a group of built virtual optical networks may be divided into a plurality of spectrum trading groups. Virtual optical networks in one same group may trade respective spectrum resources with each other. Virtual optical networks in different groups are not allowed to perform spectrum resource trading. To balance spectrum resource trading in each spectrum trading group, during grouping, real-time service traffic of the virtual optical networks needs to be considered, to avoid that most virtual optical networks in one same group have idle spectra or lack spectra. In some specific implementations, a ratio of virtual optical networks with idle spectrum resources to virtual optical networks with insufficient spectrum resources in each spectrum trading group is set to 1:1, to further improve the utilization of spectrum resources.

Because a spectrum trading problem is an NP-hard problem, in a large-scale network, it is very difficult for the foregoing ILP model to find an optimal solution within an effective time, and the efficiency of spectrum resource trading is not high. In view of this, the present application further provides another implementation method. Spectrum trading between virtual optical networks in one time slot is considered in the method (the method is referred to as a heuristic algorithm in the present application), a service with relatively heavy undeployed service traffic is preferentially transmitted, till all virtual links are traversed. Specific steps may be shown as follows:

1. After service traffic is deployed for the virtual optical networks by using pre-allocated spectra, put a virtual link with undeployed service traffic in each virtual optical network on a pre-established virtual link list.

One virtual optical network corresponds to one virtual link list. The virtual links in the virtual link list may be randomly sorted, or may be arranged in descending order of undeployed service traffic values of the virtual links, or may be arranged in ascending order of undeployed service traffic values of the virtual links. This does not affect the implementation of the present application.

2. Sequentially take a first virtual link from the virtual link list till the virtual link list is empty, where an undeployed service traffic value of the first virtual link is the largest in the virtual link list.

For a virtual link list of each virtual optical network, a virtual link with the largest undeployed service traffic value is selected from the virtual link list. The following step 3 or 4 is performed. After the step is performed, a virtual link with the largest undeployed service traffic value continues to be selected from the virtual link list, till the virtual link list is empty.

A virtual link with the heaviest undeployed service traffic is preferentially deployed, so that eventually the successfully deployed service traffic may be heaviest.

3. If a cumulative credit value of a virtual optical network to which the first virtual link belongs is not less than the credit threshold, examine, by using a spectrum window, spectrum usage of a physical path in which the first virtual link is located, select idle spectra by using a first-fit algorithm to transmit undeployed service traffic of the first virtual link, delete the first virtual link from the virtual link list, and update the cumulative credit value of the corresponding virtual optical network.

The spectrum window is built in advance. For a building process, reference may be made to the description of the related art. Details are not described again herein.

For an implementation method of selecting idle spectrum resources from the virtual optical networks by using the first-fit algorithm, reference may be made to the principle of the first-fit algorithm. Details are not described again herein.

A virtual link with undeployed service traffic is included in the virtual link list. Therefore, after the undeployed service traffic of the first virtual link has been transmitted, the first virtual link may be deleted from the virtual link list.

4. If a cumulative credit value of a virtual optical network to which the first virtual link belongs is less than the credit threshold, delete the first virtual link from the virtual link list.

To further improve the implementation efficiency of the method, virtual links of each virtual optical network may be arranged in descending order of undeployed service traffic values, and the sorted virtual links are put on the pre-established virtual link list sequentially, where the first virtual link in the virtual link list has the largest undeployed service traffic value, so that the time of selecting a first virtual link from the virtual link list is reduced, to help to improve the efficiency of spectrum trading.

Figure 3:
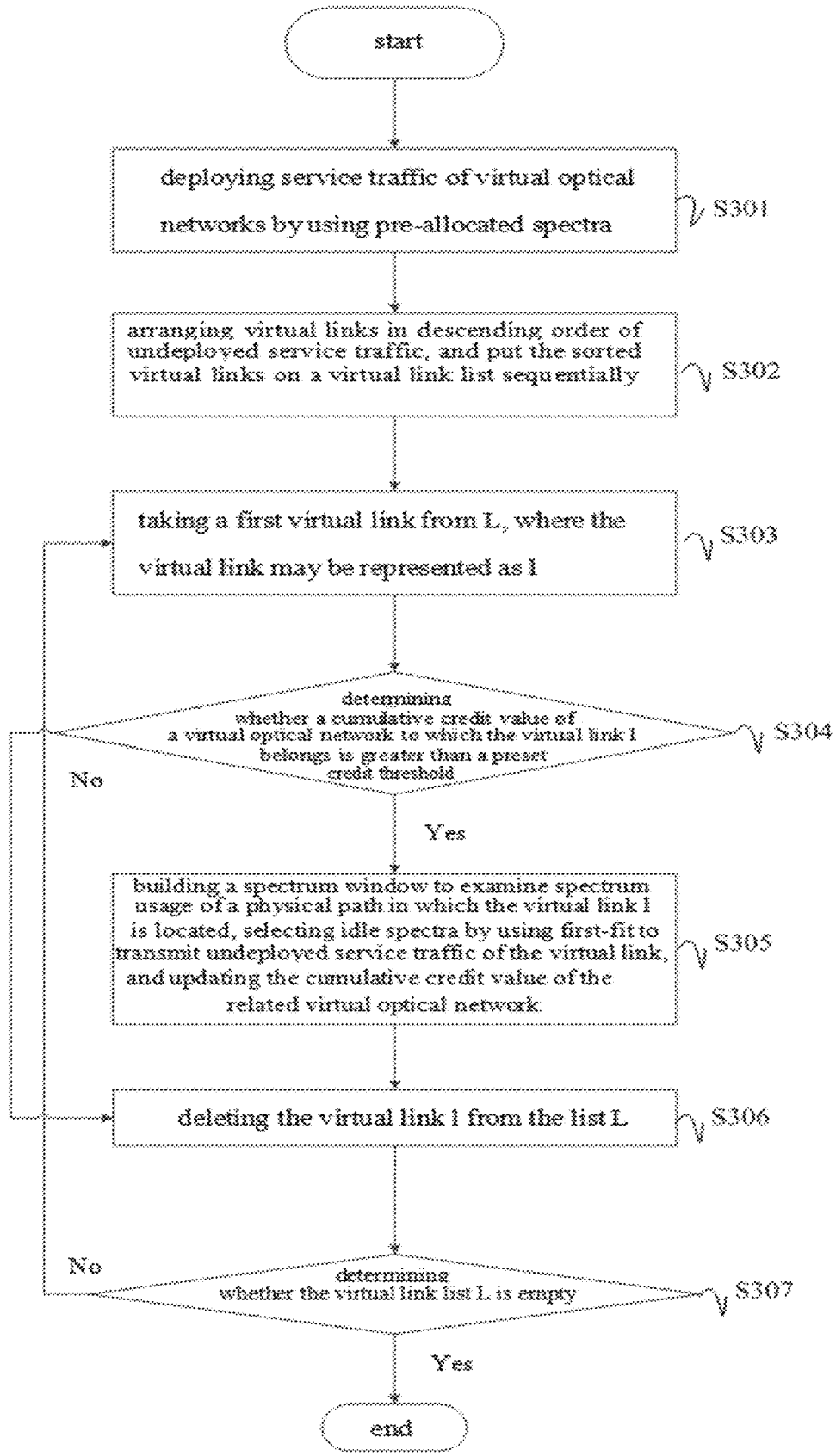
FIG. 3 is a schematic flowchart of another virtual optical network-oriented spectrum resource trading method according to an embodiment of the present invention.

Based on this, the present application further provides an embodiment, referring to FIG. 3. This embodiment of the present application may include the following content:

S301: deploying service traffic of virtual optical networks by using pre-allocated spectra.

S302: arranging virtual links in descending order of undeployed service traffic, and put the sorted virtual links on a virtual link list sequentially.

The virtual link list after sorting may be represented by L.

S303: taking a first virtual link from L, where the virtual link may be represented as 1.

If the virtual links in the virtual link list are arranged in ascending order, in this case, the first virtual link is the last virtual link in the list L.

S304: determining whether a cumulative credit value of a virtual optical network to which the virtual link 1 belongs is greater than a preset credit threshold, and if yes, performing S305; or otherwise, performing S306.

S305: building a spectrum window to examine spectrum usage of a physical path in which the virtual link 1 is located, selecting idle spectra by using first-fit to transmit undeployed service traffic of the virtual link, and updating the cumulative credit value of the related virtual optical network.

S306: deleting the virtual link 1 from the list L.

S307: determining whether the virtual link list L is empty, and if yes, ending spectrum trading; or if not, the process turning to S303.

In this embodiment of the present invention, after virtual links are arranged in descending order of undeployed service traffic, a service with relatively heavy undeployed service traffic is preferentially transmitted, till all virtual links are traversed, so that the efficiency of spectrum resource trading is effectively improved.

When a relatively large quantity of services are run in a current system, virtual optical networks all transmit respective service traffic, and there are hardly idle spectrum resources. In the foregoing spectrum trading method, a virtual optical network can only trade spectra possessed by the virtual optical network (allocated to the virtual optical network). However, when there is relatively heavy service traffic on most virtual optical networks, there are a small quantity of tradable idle spectra, and a congestion rate of services rises. Therefore, when a virtual optical network cannot obtain idle spectra through trading, the virtual optical network uses spectrum resources that are not allocated by a carrier to the virtual optical networks to transmit the undeployed service traffic of the first virtual link, and pays a corresponding charge.

For the embodiment corresponding to FIG. 3, after S304, it may be first determined whether idle spectrum resources of virtual optical networks that have a common physical link with the first virtual link are sufficient to transmit the undeployed service traffic of the first virtual link. If the idle spectrum resources of virtual optical networks that have a common physical link with the first virtual link are not sufficient to transmit the undeployed service traffic of the first virtual link, spectrum resources that are not allocated by a carrier to the virtual optical networks are used to transmit the undeployed service traffic of the first virtual link, and a corresponding charge is paid to the carrier. That is, if an FS demand quantity for the first virtual link to transmit the undeployed service traffic of the first virtual link cannot be completely obtained through spectrum resource trading, in this case, an FS lack quantity may be obtained from the carrier, and a charge corresponding to the FS lack quantity is paid. For example, the first virtual link demands five FSs to transmit the undeployed service traffic of the first virtual link, and four FSs may be obtained through spectrum resource trading. In this case, one FS may be purchased from the carrier to transmit service traffic. The purchased spectrum resource is a spectrum resource that is not allocated to the virtual optical networks.

If idle spectrum resources of virtual optical networks that have a common physical link with the first virtual link are sufficient to transmit the undeployed service traffic of the first virtual link, a first-fit algorithm is used to select idle spectra from the spectrum resources allocated to the virtual optical networks to transmit the undeployed service traffic of the first virtual link. That is, S305 is performed.

When the virtual optical networks have a relatively small quantity of idle spectrum resources, the virtual optical networks are allowed to use unallocated spectrum resources, so that the utilization of network resources can be further improved, thereby reducing a service congestion rate.

The present invention further provides a corresponding implementation apparatus for the virtual optical network-oriented spectrum resource trading method, to further make the method more practicable. The virtual optical network-oriented spectrum resource trading apparatus provided in this embodiment of the present invention is described below. For the virtual optical network-oriented spectrum resource trading apparatus described below and the virtual optical network-oriented spectrum resource trading method described above, reference may be correspondingly made to each other.

Referring to FIG. 4, FIG. 4 is a structural diagram of a specific implementation of a virtual optical network-oriented spectrum resource trading apparatus according to an embodiment of the present invention. The apparatus may include a preprocessing module 401 and a spectrum resource trading module 402.

The preprocessing module 401 is configured to: construct a group of virtual optical networks in advance according to a preset topological structure, and configure capacity demand parameters for virtual links of each virtual optical network; and the capacity demand parameter includes a virtual optical network to which a virtual link belongs, a source node and a destination node of the virtual link, a time slot index, a start index and an end index of FSs allocated to the virtual link, and an FS demand quantity for meeting all service traffic on the virtual link (the source node and the destination node) in a current time slot.

The spectrum resource trading module 402 may be configured to control, based on capacity demand parameters of the virtual links in different time slots, cumulative credit values of the virtual optical networks, and a preset credit threshold, the virtual links between the virtual optical networks to trade spectrum resources of a common physical link, to implement that a virtual link with idle spectrum resources supplies spectrum resources to a virtual link with insufficient capacity, where the virtual optical networks have a spectrum conversion capability and a subband virtual concatenation transmission capability, and virtual links that trade spectra have a common physical link; and the cumulative credit value is a sum of credit values of a virtual optical network in time slots before the current time slot.

Preferably, in some implementations of this embodiment, the spectrum resource trading module 402 may be may be further configured to: build an ILP model in advance; and implement trading of spectrum resources between the virtual links between the virtual optical networks based on the ILP model, where constraint conditions of the ILP model include that a virtual link preferentially uses allocated FSs to bear service traffic, a virtual link does not use FSs that are not allocated to the virtual optical networks, a quantity of FSs borrowed by a virtual link does not exceed the FS demand quantity, spectra used by virtual links that have a common physical link do not overlap, and a virtual optical network whose cumulative credit value is less than the credit threshold is prohibited from using idle spectra of other virtual optical networks in the current time slot.

In some other implementations of this embodiment, the spectrum resource trading module 402 may be, for example, further configured to: for the virtual optical networks in one time slot, after service traffic is deployed for the virtual optical networks by using pre-allocated spectra, put a virtual link with undeployed service traffic in each virtual optical network on a pre-established virtual link list; sequentially take a first virtual link from the virtual link list till the virtual link list is empty, where an undeployed service traffic value of the first virtual link is the largest in the virtual link list; and if a cumulative credit value of a virtual optical network to which the first virtual link belongs is not less than the credit threshold, examine, by using a spectrum window, spectrum usage of a physical path in which the first virtual link is located, select idle spectra by using a first-fit algorithm to transmit undeployed service traffic of the first virtual link, delete the first virtual link from the virtual link list, and update the cumulative credit value of the corresponding virtual optical network; or if a cumulative credit value of a virtual optical network to which the first virtual link belongs is less than the credit threshold, delete the first virtual link from the virtual link list.

Preferably, in some other implementations, the preprocessing module 401 may be further configured to: divide the group of virtual optical networks into a plurality of spectrum trading groups, where virtual links of virtual optical networks in each spectrum trading group trade spectrum resources, and virtual optical networks in different spectrum trading groups do not trade spectrum resources.

The functions of the functional modules of the virtual optical network-oriented spectrum resource trading apparatus in this embodiment of the present invention may be specifically implemented according to the method in the foregoing method embodiment. For a specific implementation process of the apparatus, reference may be made to the related description of the foregoing method embodiment. Details are not described again herein.

As can be known from above, this embodiment of the present invention implements that the virtual optical networks trade spectrum resources according to a real-time capacity demand, so that the utilization of network spectrum resources of the virtual optical networks is effectively improved, a service congestion rate of the virtual optical networks is reduced, and the fairness of spectrum resource trading between the virtual optical networks can be further ensured.

An embodiment of the present invention further provides a virtual optical network-oriented spectrum resource trading device, which may specifically include:

a memory, configured to store a computer program; and
a processor, configured to execute the computer program to implement the steps of the virtual optical network-oriented spectrum resource trading method in any foregoing embodiment.

The functions of the functional modules of the virtual optical network-oriented spectrum resource trading device in this embodiment of the present invention may be specifically implemented according to the method in the foregoing method embodiment. For a specific implementation process of the apparatus, reference may be made to the related description of the foregoing method embodiment. Details are not described again herein.

As can be known from above, this embodiment of the present invention implements that the virtual optical networks trade spectrum resources according to a real-time capacity demand, so that the utilization of network spectrum resources of the virtual optical networks is effectively improved, a service congestion rate of the virtual optical networks is reduced, and the fairness of spectrum resource trading between the virtual optical networks can be further ensured.

An embodiment of the present invention further provides a computer-readable storage medium, storing a virtual optical network-oriented spectrum resource trading program, where the virtual optical network-oriented spectrum resource trading program is executed by a processor to implement the steps of the virtual optical network-oriented spectrum resource trading method in any foregoing embodiment.

The functions of the functional modules of the computer-readable storage medium in this embodiment of the present invention may be specifically implemented according to the method in the foregoing method embodiment. For a specific implementation process of the apparatus, reference may be made to the related description of the foregoing method embodiment. Details are not described again herein.

As can be known from above, this embodiment of the present invention implements that the virtual optical networks trade spectrum resources according to a real-time capacity demand, so that the utilization of network spectrum resources of the virtual optical networks is effectively improved, a service congestion rate of the virtual optical networks is reduced, and the fairness of spectrum resource trading between the virtual optical networks can be further ensured.

An embodiment of the present invention further provides a virtual optical network-oriented spectrum resource trading system, which may include an SDN controller and a memory.

For flexible and efficient spectrum trading, an SDN technology may be used to manage a network. SDN is a dynamic, manageable, flexible, and efficient emerging architecture, and is an optimal solution of managing a current network that meet requirements of high bandwidth, low latency, and dynamic feature. In the spectrum trading system, an SDN processor is formed by distributed SDN controllers, and is configured to execute a computer program stored in the memory to implement the steps of any foregoing virtual optical network-oriented spectrum resource trading method.

Each SDN controller directly manages one virtual optical network. The main functions of the SDN controller are as follows:

creating a virtual optical network: The SDN controller virtualizes a user service, and creating a virtual optical network.

mapping a virtual optical network: The SDN controller maps the created virtual optical network to a physical optical network in an optimized manner, to allocate spectrum resources to the virtual optical network.

performing spectrum trading: The SDN controller controls the virtual optical networks to perform spectrum trading.

reconfiguring a network: The SDN controller reconfigures the network according to a result of the spectrum trading.

In a spectrum trading scheme, a malicious user may tamper spectrum trading data to use idle spectrum resources of other users. To protect the security of user data, a blockchain technology is introduced into the spectrum trading system, and a blockchain-based database plane is built. The blockchain is an emerging distributed storage technology, and stores data information in blocks. A newly created block is connected to original blocks, to form a chain structure.

In the spectrum trading system, the memory includes a blockchain database. The blockchain database saves spectrum resource trading data information between virtual optical networks in a data block according to a preset storage format. That is, trading data generated from spectrum trading between users (the virtual optical networks) is stored in the data block of the blockchain. The storage format of the data block is formed by a block sequence number, an index of a time slot in which current spectrum resource trading occurs, a first virtual optical network and a second virtual optical network participating in spectrum resource trading, a physical link index, a current spectrum status, an updated spectrum status, a current cumulative credit value, virtual link indices, an FS demand quantity, a current time slot credit value, and an updated cumulative credit value of the first virtual optical network, and a current cumulative credit value, virtual link indices, an FS supply quantity, a current time slot credit value, and an updated cumulative credit value of the second virtual optical network.

The storage format of the data block may be shown in FIG. 5. A user in FIG. 5 denotes a virtual optical network.

(1) Block sequence number: Each block has a unique sequence number for differentiation from other blocks.

(2) Time slot index: A time slot index is an index of a time slot in which spectrum trading occurs.

(3) User: A user is a user participating in spectrum trading. A user 1 represents a spectrum demand user, and a user 2 represents a spectrum supply user.

(4) Current cumulative credit value: A current cumulative credit value is a cumulative value of credit values of a user in all time slots.

(5) Virtual link index: A virtual link index is an index of a virtual link in which spectrum trading is performed.

(6) Physical link index: A physical link index is an index of a physical link in which spectrum trading is performed.

(7) Current spectrum status: A current spectrum status is a spectrum use status of a current virtual network.

(8) FS demand/supply quantity: An FS demand/supply quantity is a quantity of FSs demanded/supplied by a user.

(9) Current time slot credit value: A current time slot credit value is a credit value obtained by a user in a current time slot (a current time of spectrum trading).

(10) Updated spectrum status: An updated spectrum status is a spectrum use status of a virtual network after spectrum trading is completed.

(11) Updated cumulative credit value: An updated cumulative credit value is a cumulative credit value of a user after spectrum trading is completed.

A blockchain requires a related consensus protocol when creating a new block. The most widely used protocol for generating a new block is a proof-of-work (PoW) protocol. In the protocol, when the blockchain generates a new block, a very complex mathematical problem with extremely high calculation costs needs to be resolved, resulting in very high power consumption of the PoW. In addition, the PoW protocol needs to pay a reward to a user that creates a new block, causing an increase in running costs.

To resolve these problems, the present application proposes a novel consensus protocol of proof of credit (PoC). In the PoC, a creator of a new block performs selection according to the following formula:

$$\theta = C*t, \text{ where}$$

$\theta$ is a time-weighted credit value, C is a cumulative credit value of a user, and t is a duration of cumulative credit of the user. A user having a relatively large time-weighted credit value is more likely to create a new block. That is, when the time-weighted credit value of the user is larger, the user is more likely to be selected to create a new block. Because a user with a relatively large value has contributed the most to the system, the user is not likely to counterfeit data to affect the contribution of the user, so that data security can be improved.

After the user creates a new block, a duration of cumulative credit of the user is reset.

Compared with the PoW, the PoC has the following advantages:

The PoC does not need to pay a reward to a user that creates a new block, thereby reducing system costs.

The PoC can enhance the security of data. A time-weighted credit value of a malicious user needs to exceed a total sum of time-weighted credit values of all other users to pass a consensus protocol to manipulate a blockchain.

A user in this embodiment of the present invention is a virtual optical network.

The functions of the functional modules of the virtual optical network-oriented spectrum resource trading system in this embodiment of the present invention may be specifically implemented according to the method in the foregoing method embodiment. For a specific implementation process of the apparatus, reference may be made to the related description of the foregoing method embodiment. Details are not described again herein.

As can be known from above, an SDN control plane is used to build and manage virtual optical networks and perform spectrum trading. The blockchain database plane is used for distributed storage of data of spectrum trading, so that not only spectrum trading between the virtual optical networks can be managed more flexibly, but also the security of trading data can be further ensured.

Finally, to prove that the technical solutions provided in the present application can effectively improve the utilization of network resources of virtual optical networks, the present application further performs simulation analysis.

Figure 6:
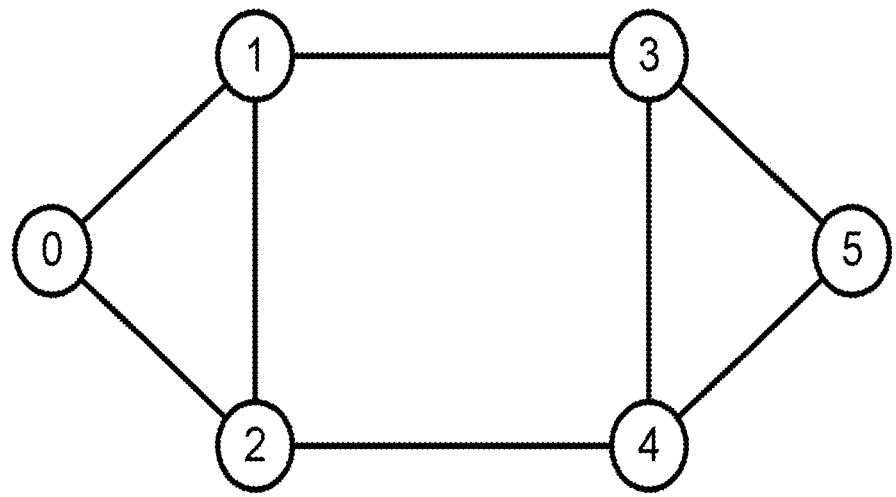
FIG. 6 is a schematic structural diagram of a test physical optical network according to an exemplary embodiment of the present disclosure.
Figure 7:
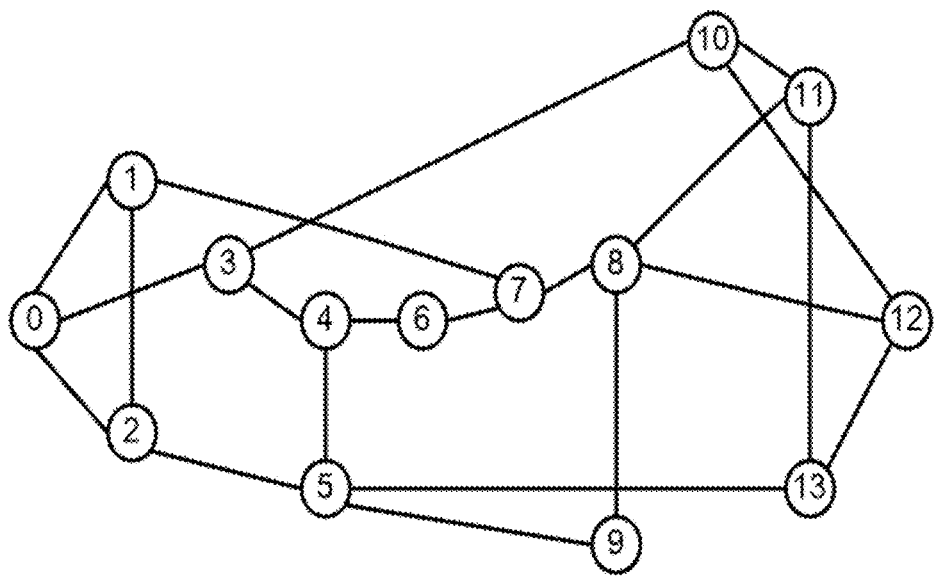
FIG. 7 is a schematic structural diagram of a test physical optical network according to another exemplary embodiment of the present invention.

In the present application, an n6s8 network (six nodes and eight links) and an NSFNET network (fifteen nodes and 21 links) are used to perform a performance test on a spectrum trading scheme. The test network is respectively shown in FIG. 6 and FIG. 7. According to a transmission distance in Table 1, a modulation format used by a virtual link is determined according to a distance of a physical path in which a virtual link is located.

TABLE 1

Transmission distances in different modulation formats

| Modulation format | Spectrum efficiency (bit/symbol) | Frequency slot capacity (Gb/s) | Transmission distance (km) |
|---|---|---|---|
| BPSK | 1 | 25 | 4000 |
| QPSK | 2 | 50 | 2000 |
| 8-QAM | 3 | 75 | 1000 |

It is assumed that there are a total of eight virtual optical networks. Quantities of virtual nodes and virtual links in each virtual optical network are respectively randomly generated within $$\left[\frac{N}{2}, N\right]$$

and $$\left[\frac{L}{2}, L\right],$$

where N and L are respectively quantities of nodes and links in a physical network. Average service traffic of a virtual link is selected from a set X∈{40, 60, . . . , 140} Gb/s, and actual service traffic is randomly generated within a [10,2X−10] Gb/s range. A cumulative credit threshold of the virtual optical networks is set to μ=−10. To reduce the calculation complexity of an ILP model, at most two nonadjacent subbands may be used.

Figure 8:
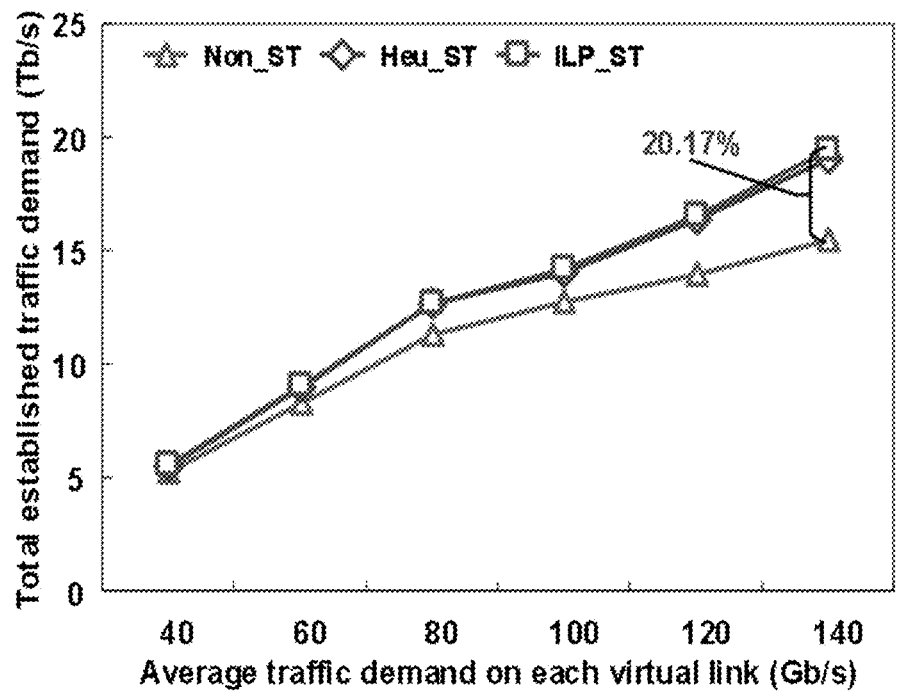
FIG. 8 is a schematic comparison diagram of performance test results according to the spectrum trading method shown in the embodiment of FIG. 6 according to the present invention.

FIG. 8 shows the impact of average service traffic of virtual links on total service traffic that the virtual optical networks bear in the n6s8 network. "Non_ST", "Heu_ST", and "ILP_ST" respectively correspond to results of a case in which a spectrum trading scheme is not used, a case in which a heuristic algorithm of a spectrum trading method is used, and a case in which an ILP model is used. As shown in FIG. 8, compared with the case in which a spectrum trading scheme is not used, more service traffic is borne in the case in which a spectrum trading scheme is used. As the average service traffic of the virtual links increases, a difference between the case in which spectrum trading is used and a case in which spectrum trading is not used becomes more significant. When the average service traffic is heavier, there are larger fluctuations in actual service traffic. When the average service traffic of the virtual links is 70 Gb/s, a difference between results of the case in which spectrum trading is used and the case in which spectrum trading is not used exceeds 20%. In addition, the results of the case in which the heuristic algorithm is used and the case in which an ILP model is used are basically consistent. This indicates that the heuristic algorithm in the present application can solve within an appropriate calculation time a result that approximates the optimal solution.

Figure 9:
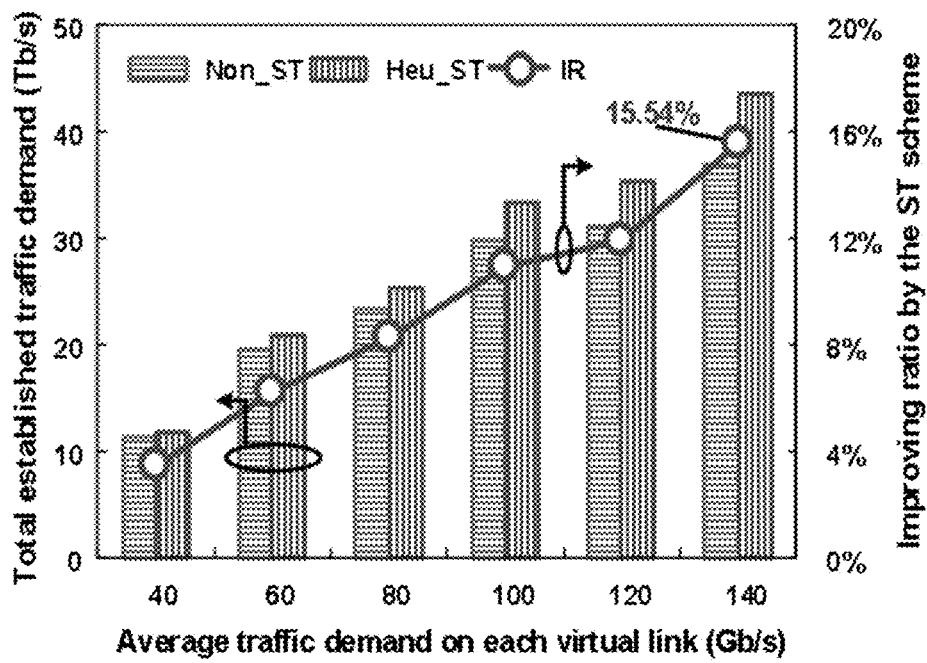
FIG. 9 is a schematic comparison diagram of performance test results according to the spectrum trading method shown in the embodiment of FIG. 7 according to the present invention.
Figure 10:
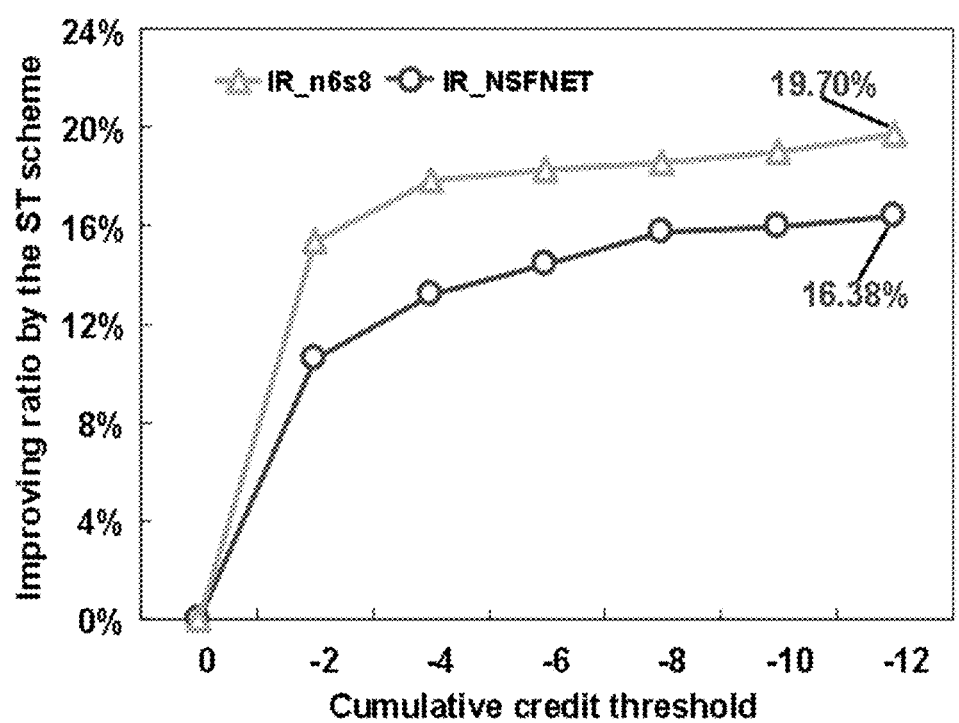
FIG. 10 is a schematic comparison diagram of the impact of a cumulative credit value on spectrum resource trading performance according to the present invention.

Similar simulation is performed in the NSFNET network. The results are shown in FIG. 9. The curve "IR" represents an improving ratio of total service traffic that a network bears when a spectrum trading scheme is used as compared with the case in which a spectrum trading scheme is not used. As the requirement of the average service traffic of the virtual links increases, the performance of the spectrum trading scheme gradually increases. For the results based on the heuristic algorithm, FIG. 10 shows impact of the cumulative credit threshold on the performance of the spectrum trading scheme (X=140 Gb/s). As the cumulative credit threshold decreases, the performance of the spectrum trading scheme gradually increases. However, when the cumulative credit threshold decreases to a particular value, the improvement in the performance of the spectrum trading scheme tends to be saturated.

As can be known from above, this embodiment of the present invention implements that the virtual optical networks trade spectrum resources according to a real-time capacity demand, so that the utilization of network spectrum resources of the virtual optical networks is effectively improved, a service congestion rate of the virtual optical networks is reduced, and the fairness of spectrum resource trading between the virtual optical networks can be further ensured.

All embodiments are described in the description in a progressive manner. Each embodiment describes only the difference from other embodiments. For the same or similar parts among all embodiments, reference may be made to the relevant parts. For the apparatus disclosed in the embodiments, because the apparatus corresponds to the method disclosed in the embodiments, the description is relatively simple. For related parts, reference may be made to the description of the method part.

A person skilled in the art may further be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be directly implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

The virtual optical network-oriented spectrum resource trading method and system provided in the present invention are described above in detail. Although the principle and implementations of the present invention are described by using specific examples in this specification, descriptions of the embodiments are merely intended to help understand the methods and core idea of the present invention. It should be noted that for a person of ordinary skill in the art, several improvements and modifications may further be made to the present invention without departing from the principle of the present invention. These improvements and modifications should also fall within the protection scope of the claims of the present invention.

What is claimed is:

1. A virtual optical network-oriented spectrum resource trading method, comprising:

constructing a group of virtual optical networks in advance according to a preset topological structure, and configuring capacity demand parameters for virtual links of each virtual optical network;

controlling, based on capacity demand parameters of the virtual links in different time slots, cumulative credit values of the virtual optical networks, and a preset credit threshold, the virtual links between the virtual optical networks to trade spectrum resources of a common physical link, to implement that a virtual link with idle spectrum resources supplies spectrum resources to a virtual link with insufficient capacity, wherein the virtual optical networks have a spectrum conversion capability and a subband virtual concatenation transmission capability, and virtual links that trade spectra have a common physical link; the capacity demand parameter comprises a virtual optical network to which a virtual link belongs, a source node and a destination node of the virtual link, a time slot index, a start index and an end index of frequency slots (FSs) allocated to the virtual link, and an FS demand quantity for meeting all service traffic on the virtual link (the source node and the destination node) in a current time slot; and the cumulative credit value is a sum of credit values of a virtual optical network in time slots before the current time slot.

2. The virtual optical network-oriented spectrum resource trading method according to claim 1, wherein the controlling, based on capacity demand parameters of the virtual links in different time slots, cumulative credit values of the virtual optical networks, and a preset credit threshold, the virtual links between the virtual optical networks to trade spectrum resources of a common physical link comprises:

building an integer linear programming (ILP) model in advance; and implementing trading of spectrum resources between the virtual links between the virtual optical networks based on the ILP model, wherein constraint conditions of the ILP model comprise that a virtual link preferentially uses allocated FSs to bear service traffic, a virtual link does not use FSs that are not allocated to the virtual optical networks, a quantity of FSs borrowed by a virtual link does not exceed the FS demand quantity, spectra used by virtual links that have a common physical link do not overlap, and a virtual optical network whose cumulative credit value is less than the credit threshold is prohibited from using idle spectra of other virtual optical networks in the current time slot.

3. The virtual optical network-oriented spectrum resource trading method according to claim 2, wherein the constraint conditions of the ILP model further comprise that a quantity of nonadjacent subbands deployed for use by the virtual links does not exceed 2.

4. The virtual optical network-oriented spectrum resource trading method according to claim 1, wherein the controlling, based on capacity demand parameters of the virtual links in different time slots, cumulative credit values of the virtual optical networks, and a preset credit threshold, the virtual links between the virtual optical networks to trade spectrum resources of a common physical link comprises:

for the virtual optical networks in one time slot, after service traffic is deployed for the virtual optical networks by using pre-allocated spectra, putting a virtual link with undeployed service traffic in each virtual optical network on a pre-established virtual link list;

sequentially taking a first virtual link from the virtual link list till the virtual link list is empty, wherein an undeployed service traffic value of the first virtual link is the largest in the virtual link list; and if a cumulative credit value of a virtual optical network to which the first virtual link belongs is not less than the credit threshold, examining, by using a spectrum window, spectrum usage of a physical path in which the first virtual link is located, selecting idle spectra by using a first-fit algorithm to transmit undeployed service traffic of the first virtual link, deleting the first virtual link from the virtual link list, and updating the cumulative credit value of the corresponding virtual optical network; or if a cumulative credit value of a virtual optical network to which the first virtual link belongs is less than the credit threshold, deleting the first virtual link from the virtual link list.

5. The virtual optical network-oriented spectrum resource trading method according to claim 4, wherein the putting a virtual link with undeployed service traffic in each virtual optical network on a pre-established virtual link list comprises:

arranging virtual links of each virtual optical network in descending order of undeployed service traffic values, and putting the sorted virtual links on the pre-established virtual link list sequentially; and correspondingly, the first virtual link is the first virtual link in the virtual link list.

6. The virtual optical network-oriented spectrum resource trading method according to claim 4, wherein the examining, by using a spectrum window, spectrum usage of a physical path in which the first virtual link is located, and selecting idle spectra by using a first-fit algorithm to transmit undeployed service traffic of the first virtual link comprises:

determining whether idle spectrum resources of virtual optical networks that have a common physical link with the first virtual link are sufficient to transmit the undeployed service traffic of the first virtual link; and if not, using spectrum resources that are not allocated by a carrier to the virtual optical networks to transmit the undeployed service traffic of the first virtual link, and paying a corresponding charge; or if yes, selecting, by using the first-fit algorithm, idle spectra from the spectrum resources allocated to the virtual optical networks to transmit the undeployed service traffic of the first virtual link.

7. The virtual optical network-oriented spectrum resource trading method according to claim 1, after the constructing a group of virtual optical networks in advance according to a preset topological structure, the method further comprises:

dividing the group of virtual optical networks into a plurality of spectrum trading groups, wherein virtual links of virtual optical networks in each spectrum trading group trade spectrum resources, and virtual optical networks in different spectrum trading groups do not trade spectrum resources.

8. A virtual optical network-oriented spectrum resource trading system, comprising a software-defined networking (SDN) controller and a memory, wherein the SDN controller is configured to execute a computer program stored in the memory to implement the steps of the virtual optical network-oriented spectrum resource trading method according to claim 1.

9. The virtual optical network-oriented spectrum resource trading system according to claim 8, wherein the memory comprises a blockchain database, wherein the blockchain database saves spectrum resource trading data information between virtual optical networks in a data block according to a preset storage format; and the storage format of the data block is formed by a block sequence number, an index of a time slot in which current spectrum resource trading occurs, a first virtual optical network and a second virtual optical network participating in spectrum resource trading, a physical link index, a current spectrum status, an updated spectrum status, a current cumulative credit value, virtual link indices, an FS demand quantity, a current time slot credit value, and an updated cumulative credit value of the first virtual optical network, and a current cumulative credit value, virtual link indices, an FS supply quantity, a current time slot credit value, and an updated cumulative credit value of the second virtual optical network.

10. The virtual optical network-oriented spectrum resource trading system according to claim 9, wherein the blockchain database selects a virtual optical network according to the following formula to create a new data block:

$\theta = C^* t$, wherein in the formula, $\theta$ is a time-weighted credit value, C is a current cumulative credit value of the virtual optical network in a current time slot, and t is a duration of the current cumulative credit value.

* * * * *